W. H. F. SCHMIEDING 3,130,927

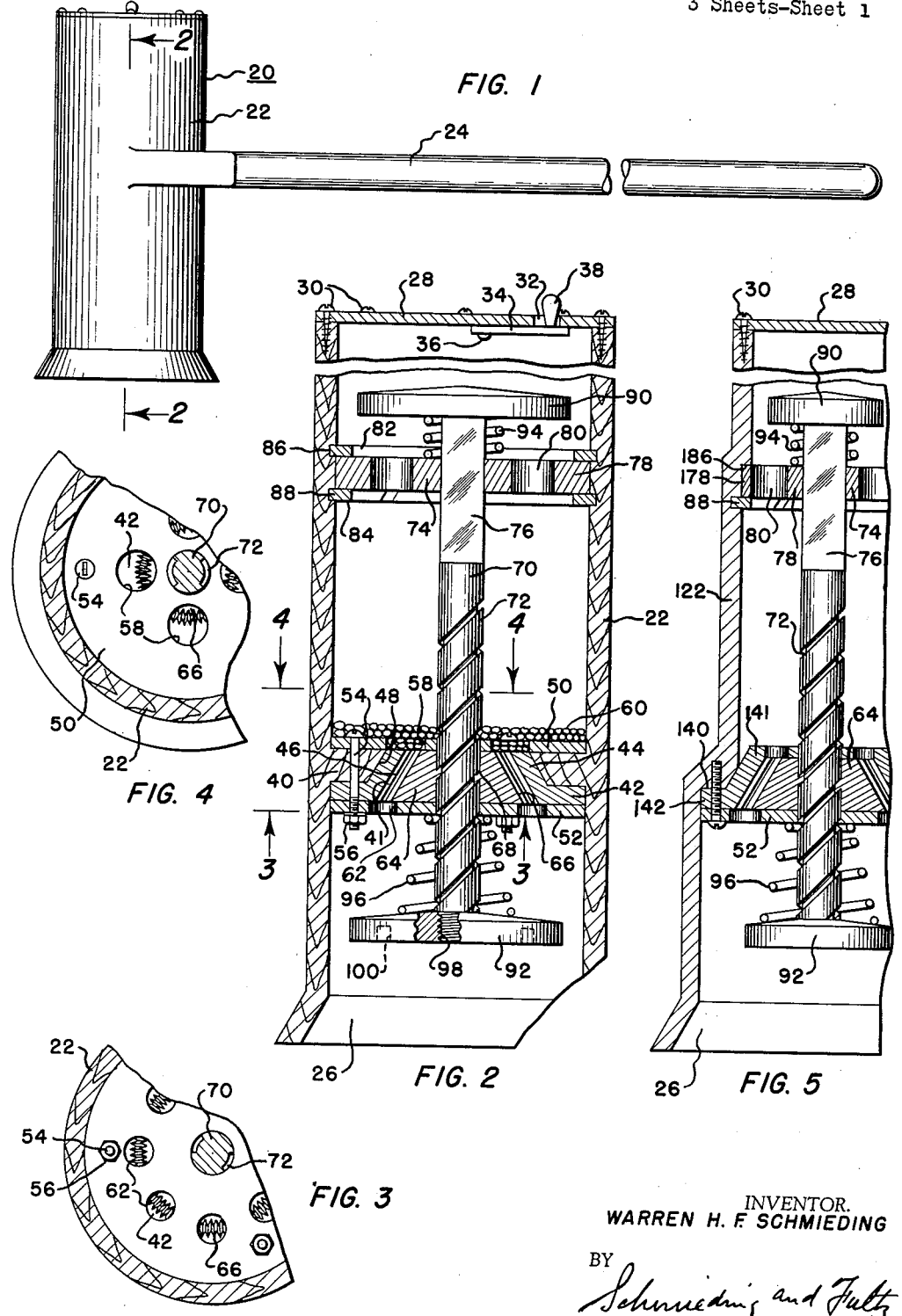
April 28, 1964    W. H. F. SCHMIEDING    3,130,927
PEPPER-CORN GRINDER
Filed April 17, 1961    3 Sheets-Sheet 1
INVENTOR.
WARREN H. F. SCHMIEDING April 28, 1964

PEPPER-CORN GRINDER

Filed April 17, 1961

INVENTOR.
WARREN H. F. SCHMIEDING

BY

ATTORNEYS

April 28, 1964

W. H. F. SCHMIEDING 3,130,927

PEPPER-CORN GRINDER

Filed April 17, 1961

INVENTOR.
WARREN H. F. SCHMIEDING
BY

ATTORNEYS

United States Patent Office 3,130,927
Patented Apr. 28, 1964

3,130,927
PEPPER-CORN GRINDER
Warren H. F. Schmieding, 4909 Vista Arroyo, Mount
Helix, La Mesa, Calif.
Filed Apr. 17, 1961, Ser. No. 104,203
15 Claims. (Cl. 241—168)

The present invention relates to a shaker type pepper-corn grinder and more particularly to the type of grinder which is caused to function as such by merely shaking the same. The present invention is a continuation-in-part of my co-pending application Serial No. 689,528, filed October 11, 1957, entitled "Pepper-corn Grinder."

The shaker type pepper-corn grinder of the present invention comprises a unit including a casing for holding the pepper-corns to be ground. The casing is provided with an opening in the bottom thereof through which the ground pepper is discharged. Cooperating grinding elements are disposed within the casing, one thereof being movable relative to the other. Mechanism is provided for causing relative movement of the grinding elements by merely reciprocating the grinding unit.

More specifically, one of the grinding elements is rotated relative to another grinding element and it is rotated through gearing which is actuated by shaking or reciprocating the grinding unit. In the embodiments illustrated, the rotatable grinding element is internally threaded and is caused to rotate by causing relative reciprocation between it and a worm, the worm being threaded in the grinding element.

Preferably the grinding unit includes an elongated horizontally extending handle by which the unit is manually shaken or reciprocated.

Further objects and advantages will be apparent from the following description, reference being had to the accompanying drawings wherein preferred embodiments of the invention are illustrated.

In the drawings:

FIG. 1 is a side view of one form of the shaker type pepper-corn grinder;

FIG. 2 is a sectional view taken on line 2—2 of FIG. 1, but on a larger scale;

Figure 6:
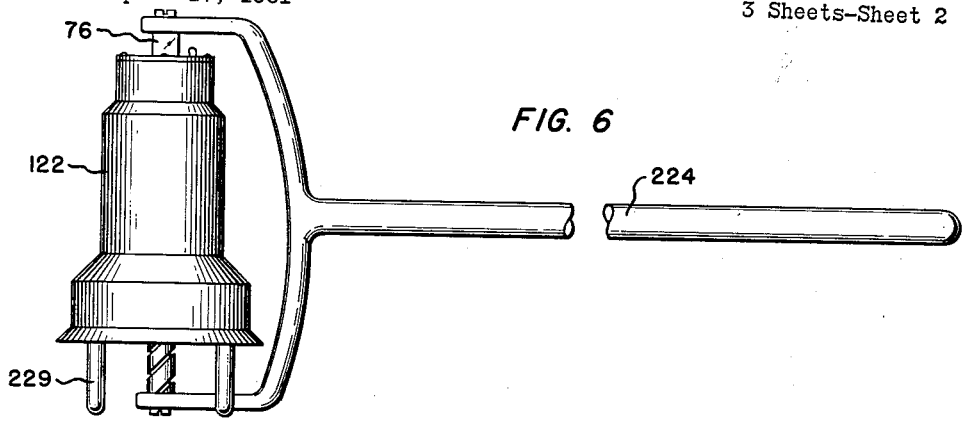
Figure 7:
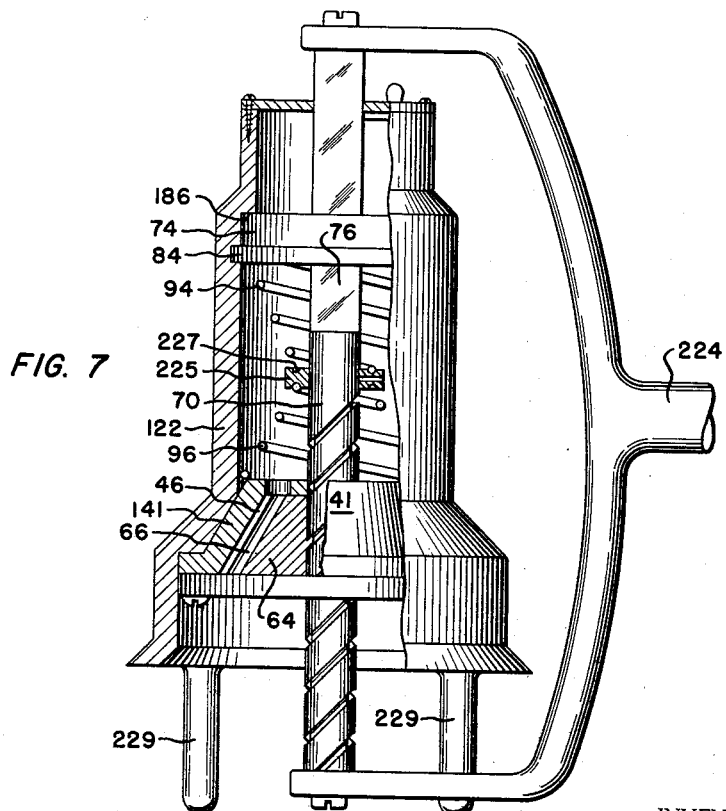
Figure 8:
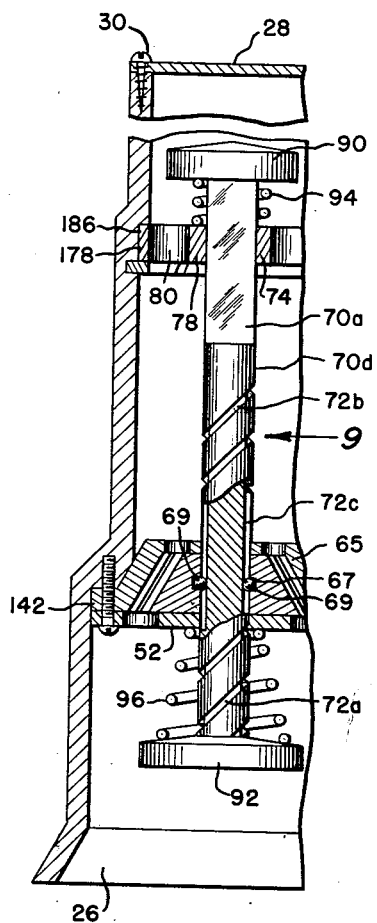

FIGS. 3 and 4 are sectional views taken respectively on lines 3—3 and 4—4 of FIG. 2;

FIG. 5 is a view similar to FIG. 2, but showing another embodiment of the invention;

FIG. 6 is a side view of still another embodiment of the invention;

FIG. 7 is a view partly in section of the embodiment shown in FIG. 6 but on a somewhat larger scale;

FIG. 8 is a fragmentary view showing the preferred form of worm shaft; and

Figure 9:
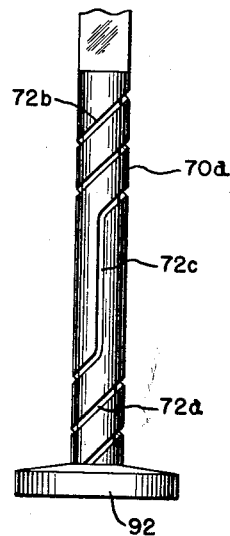

FIG. 9 is a fragmentary view of the worm shaft looking in the direction of arrow 9 of FIG. 8.

Referring more in detail to the drawings, the pepper grinding unit 20 includes a casing 22 for containing whole pepper-corns which are to be ground. Preferably the unit also includes a handle 24 for manipulating the unit. The casing may be formed of wood, metal or plastic. The lower part of the casing is open as at 26 for the egress of ground pepper. The top of the casing is provided with a removable cover 28 which may be held in place in any suitable manner as by screws 30. The cover is provided with an inlet opening 32 through which the pepper-corns are poured into the interior of the casing. A sub-cover 34 is pivoted at 36 and is disposed within the casing. This sub-cover can be moved by handle 38 to close the opening 32.

A circular ledge 40 extends inwardly from the side walls of the casing 22 and is disposed transversely of the longitudinal length of the casing 22 and intermediate the ends of the casing 22. One of the two grinding elements is fixedly attached to the ledge 40. This grinding element 41 includes a base 42 and an integrally formed frustro conically shaped section 44 having grinding teeth 46, similar to the teeth of a file, on the inner surface thereof. This section 44 fits within a complementary shaped opening 48 in the ledge 40. An upper thrust plate 50 and a lower thrust plate 52 are also secured to the ledge 40, the plate 50 being disposed directly above the ledge 40 and the plate 52 being disposed below the base 42 of the grinding element 41. These plates 50 and 52, and grinding element 41, are secured to the ledge by bolts 54 and nuts 56. The upper plate 50 is provided with a plurality of holes 58 for the passage therethrough of the pepper-corns indicated at 60 and the lower plate 52 is provided with a plurality of holes 62 for the passage of ground pepper therethrough.

A frustro conically shaped grinding element 64 is centrally disposed within the grinding element 41 and it is provided with teeth 66 which are shaped similarly to the teeth 46 of grinding element 41, and confront the teeth 46. The grinding elements 41 and 64 are arcuately shaped in cross-section and preferably are circular in shape, the entire circular area of the grinding elements being each provided with teeth. Obviously when relative movement is imparted between the grinding elements 41 and 64, pepper-corns will be ground between the teeth and passed through bottom outlet 26 of the casing.

Coming now to the mechanism for rotating the grinding element 64, the element 64 is internally threaded as at 68 axially thereof to thus form an internally threaded worm gear. A worm 70, spirally threaded as at 72, meshes with the teeth 68. Obviously then when reciprocating movement is imparted to the worm 70, a resultant rotary movement is imparted to the grinding element 64. The plates 50 and 52 provide lower bearing surfaces for the worm 70 and the top of the worm 70 is guided by a bearing 74. Preferably a non-circular portion 76 is formed on the worm 70 and the bearing surface 74 complements this non-circular portion of the worm 70, to prevent rotation of the worm 70. Preferably the portion 76 is flat and the complementing bearing surface is also flat. The bearing 74 is formed in a circular plate 78 having openings 80 therethrough, through which pepper-corns may pass. The circular plate 78 is held in position by split rings 82 and 84 which fit within grooves 86 and 88 in the interior wall of the casing 22.

It will be apparent that because of the mass of the worm 70, due to inertia, the worm 70 will lag behind quick shaking movement (up and down) of the rest of the unit, including the rotatable worm gear grinding element 64. The relative up and down movement of the grinding element 64 with respect to the worm 70, of course, will cause rotation of the grinding element 64, and, the rotation of the grinding element 64 with respect to the stationary element 41, will cause the pepper-corns to be ground. Preferably weights 90 and 92 are attached to the upper and lower ends of the shaft or worm 70 so as to increase the lagging of movement of the worm 70 with respect to the remaining parts of the unit.

Resilient means in the form of springs 94 and 96 yieldingly limit the extent of relative movement between the worm 70 and the remaining parts of the unit. Spring 94 is interposed between the central bearing section 74 of plate 78 and the under side of weight 90, while spring 96 is interposed between the under part of plate 52 and the upper part of weight 92. The weight 92 is threaded on to the shaft 70 as is shown at 98.

In assembling the apparatus, either the plate 50 or the grinding element 41 and plate 52 are first placed in position, the plate 50 being inserted from the top of the casing while the grinding element 41 and the plate 52 are inserted from the bottom of the casing. These parts are then held in place by the bolts 54 and nuts 56. Next the ring 88 is placed in position; then plate 78 is placed thereon, and thereafter the ring 82 is placed in position to hold the plate 78 in fixed position. The assembly, including the shaft 70, spring 94 and weight 90, is then inserted through the top opening of the casing; the teeth 72 of the worm 70 are then threaded with the teeth 68 of the worm gear 64. After the worm 70 is threaded through the worm gear 64, the spring 96 is then inserted from the bottom, and thereafter the weight 92 is threaded on to the lower end of the worm 70, there being sockets 100, in the weight 92 through which and by wrench the weight is screwed to the worm 70. Thereafter the cover 28 is added.

The casing 122, in this embodiment shown in FIG. 5, is preferably molded. This casing is provided with an upper inset portion 186 and a lower inset portion 140. These inset portions form shoulders for the plate 178 and for the base 142 of the grinding element 141. In this embodiment, the upper central portion of element 141 functions as a thrust ring for grinding element 64. The remaining parts of the unit are the same or substantially the same as those disclosed with respect to FIGS. 1 to 4. From the foregoing it will be seen that by this embodiment the ring 82 and the plate 50 are eliminated, and also the casing 122 is such that it can be withdrawn from a mold. In this embodiment the plate 52 alone functions as the lower guide for the worm 70.

Coming now to the embodiment shown in FIGS. 6 and 7, here the mechanism is substantially the same as that shown in the embodiment shown in FIG. 5, the main difference lying in that instead of fastening the handle 24 to the casing 22, the handle 224 is fastened directly to the shaft or worm 70. Also in this embodiment a ring 225 is secured to the worm 70 intermediate the upper bearing 74 and the grinding element 41. Plate 225 is provided with upper and lower grooves 227 forming sockets for springs 94 and 96. In this embodiment spring 94 is interposed between the ring 225 and the ring 84, and spring 96 is interposed between ring 225 and the grinding element 41. Legs 229 may be formed integrally and extend from the bottom of the casing 122 for supporting the unit independently of the handle 224.

It will be seen from this embodiment that as the handle 224 is shifted upwardly and downwardly, the rest of the unit will lag behind the handle, resulting in relative movement being imparted to the worm 70 with respect to the worm gear grinding element 64, causing the grinding element 64 to be rotated to grind the pepper-corns.

In the preferred form of the invention, as shown in FIG. 8, the grinding element 65 is provided with two internal sockets 67, disposed 180 degrees from one another, for ball bearings 69. The shaft 70a is provided with a plurality of spiral threads 72b near the bottom thereof, two being shown, 180 degrees from one another, and is provided with like number of like spiral threads 72b above the spiral threads 72a. These threads are formed by grooves in the shaft. One of the threads 72a is connected with one of the threads 72b, by preferably, a non-spiral thread in the form of a groove 72c, and a like groove connects the other pair of threads 72a and 72b. Preferably the non-spiral connecting grooves 72c are straight and extend longitudinally of the shaft 70a.

It has been found that better results are achieved when the straight grooves 72c are provided. By employing the straight grooves, the speed of movement of the shaft 70 is increased while the grooves 72c are in complementing relationship with the ball bearings 69, since at that time no rotating movement is being imparted to the grinding element 65 and therefore it offers no turning resistance. By increasing the speed of reciprocation of the shaft 70d, the increased momentum thereof causes a faster rotation to be imparted to the grinding surface of the grinding element 65, whereas, in the other embodiments, the resistance offered by the grinding of the pepper-corns has a tendency to stall the rotation of the grinding element 65.

The present invention is particularly useful for sprinkling freshly ground pepper over meats which are being broiled above a fire, such as a charcoal fire, since the attendant need not place his hand or hands above the hot fire, but his hand may be to the side of the fire. By merely shaking the unit vertically, by the handle, the pepper-corns will be ground and will be sprinkled over the meats.

While the forms of embodiments herein shown and described constitute preferred forms, it is to be understood that other forms may be adopted falling within the scope of the claims that follow.

I claim:
1. A shaker type pepper-corn grinder unit comprising, in combination:
(A) a vertically shakable casing for pepper-corns, said casing having:
(1) closed side walls and a closed top wall, one of said walls having a filler opening,
(a) a removable cover for the opening,
(2) an opening in the bottom thereof for the discharge of ground pepper from the casing;
(B) means forming a grinding surface disposed within the casing;
(C) means forming a second grinding surface complementing the first mentioned grinding surface and rotatably movable about a vertical axis and in cooperating grinding relationship with the first mentioned grinding surface;
(D) driving means including a mechanism engaging the second mentioned means for imparting rotating movement to the second mentioned means;
(E) and means for mounting said driving means within the casing for relative vertical sliding movement between the casing and the driving means, while vertical shaking movement is imparted to the casing.
2. A shaker type pepper-corn grinder unit comprising, in combination:
(A) a vertically shakable casing for pepper-corns, said casing having:
(1) closed side walls and a closed top wall, one of said walls having a filler opening,
(a) a removable cover for the opening,
(2) an opening in the bottom thereof for the discharge of ground pepper from the casing;
(B) means forming a grinding surface disposed within the casing;
(C) means forming a second grinding surface complementing the first mentioned grinding surface and rotatably movable about a vertical axis and in cooperating grinding relationship with the first mentioned grinding surface;
(D) a vertically extending shaft extending axially through the rotatable grinding means;
(E) means for mounting the shaft within the casing for relatively vertical sliding movement between the casing and the driving means while vertical shaking movement is imparted to the casing;
(F) and a driving connection between the rotatable means and the shaft for transferring the movement of the casing, axially of the shaft, to rotating movement of the rotatable means.
3. A shaker type pepper-corn grinder as defined in claim 2, characterized in that the shaft is provided with a spiral thread connected with a substantial straight thread, and in that the rotatable means is provided with a driven element in driven relationship with the spiral and the substantially straight threads.
4. A shaker type pepper-corn grinder as defined in claim 2, characterized in that the shaft is provided with a plurality of spiral threads and a plurality of substantially straight threads, one of said spiral threads being connected with one of the substantially straight threads and the other of said spiral threads being connected with the other of said substantially straight threads, and in that the rotatable means is provided with driven elements in driven relationship with the spiral and the substantially straight threads.

5. A shaker type pepper-corn grinder as defined in claim 2, characterized in that the shaft extends vertically and is provided with a plurality of spiral threads spaced vertically of one another and connected with one another with a substantial straight thread, and in that the rotatable means is provided with a driven element in driven relationship with the spiral and the substantially straight threads.

6. A shaker type pepper-corn grinder as defined in claim 2, characterized to include:
 (G) a weight carried by the shaft;
 (H) and means for resiliently limiting movement of the shaft in either direction of its movements.

7. A shaker type pepper-corn grinder as defined in claim 2, characterized to include:
 (G) and longitudinally spaced bearings for the shaft, one of said bearings providing
  (1) means for preventing rotation of the shaft.

8. A shaker type pepper-corn grinder unit comprising, in combination:
 (A) a vertically shakable casing for pepper-corns, said casing having:
  (1) closed side walls and a closed top wall, one of said walls having a filler opening,
   (a) a removable cover for the opening,
  (2) an opening in the bottom thereof for the discharge of ground pepper from the casing;
 (B) means forming a grinding surface disposed within the casing;
 (C) means forming a second grinding surface complementing the first mentioned grinding surface and rotatably movable about a vertical axis and in cooperating grinding relationship with the first mentioned grinding surface;
 (D) a shaft extending axially through the rotatable means;
 (E) means for mounting the shaft within the casing for relatively vertical sliding movement between the casing and the driving means while vertical shaking movement is imparted to the casing;
 (F) means in the casing for preventing rotation of the shaft;
 (G) and a driving connection between the rotatable means and said shaft for transferring axial movement of the casing to rotating movement of the rotatable means.

9. A shaker type pepper-corn grinder comprising, in combination:
 (A) a vertically shakable casing, said casing having:
  (1) a horizontally disposed wall forming:
   (a) a vertically extending bearing surface,
   (b) and spaced confronting thrust bearing surfaces;
 (B) a vertically extending shaft having a spiral groove section;
 (C) means for mounting the shaft within the casing for relatively vertical sliding movement between the casing and the driving means while vertical shaking movement is imparted to the casing;
 (D) a gear having an internal tooth extending into said groove in the shaft, said gear being journaled between and in abutting relationship with the thrust bearing surfaces, said gear and said wall having:
 (E) confronting and cooperating grinding surfaces.

10. A shaker type pepper-corn grinder comprising, in combination:
 (A) a vertically shakable casing, said casing having:
  (1) a horizontally disposed wall forming:
   (a) a vertically extending bearing surface,
   (b) and spaced confronting thrust bearing surfaces;
 (B) a vertically extending shaft having a spiral groove section;
 (C) means for mounting the shaft within the casing for relatively vertical sliding movement between the casing and the driving means while vertical shaking movement is imparted to the casing;
 (D) a gear having an internal tooth extending into said groove in the shaft, said gear being journaled between and in abutting relationship with the thrust bearing surfaces, said gear and said wall having:
 (E) confronting and cooperating grinding surfaces;
 (F) and means in the casing for preventing rotation of the shaft.

11. A shaker type pepper-corn grinder comprising, in combination:
 (A) a vertically shakable casing, said casing having:
  (1) a horizontally disposed wall forming:
   (a) a vertically extending bearing surface,
   (b) and spaced confronting thrust bearing surfaces, said wall forming a support for pepper-corns;
 (B) a generally circularly shaped rotatable grinding means disposed between the thrust bearing surfaces, the periphery of said rotatable grinding means having a grinding surface;
 (C) a shaft extending axially through the grinding means;
 (D) means for mounting the shaft within the casing for relatively vertical sliding movement between the casing and the driving means while vertical shaking movement is imparted to the casing, said shaft and rotatable grinding means having complementing driving connection therebetween of the type for transferring reciprocating movement of the casing to rotating movement of the rotatable grinding means;
 (E) and grinding means carried by the casing and circularly confronting the grinding surface on the rotatable grinding means.

12. A shaker type pepper-corn grinder as defined in claim 11, characterized to include:
 (F) means for preventing rotation of the shaft.

13. A shaker type pepper-corn grinder unit comprising, in combination:
 (A) a vertically shakable casing for pepper-corns, said casing having:
  (1) closed side walls and a closed top wall, one of said walls having a filler opening,
   (a) a removable cover for the opening,
  (2) an opening in the bottom thereof for the discharge of ground pepper from the casing;
 (B) means forming an annular grinding surface disposed within the casing;
 (C) means forming a second annular grinding surface rotatably movable relative to and in cooperative relationship with the first mentioned grinding surface;
 (D) and means mounted within the casing for vertical sliding movement relative to the casing and engageable with the second mentioned means for positively causing rotatable movement to be imparted to the second mentioned means in response to vertical shaking movement of the casing.

14. A shaker type pepper-corn grinder unit comprising, in combination:
 (A) a vertically shakable casing for pepper-corns, said casing having:
  (1) closed side walls and a closed top wall, one of said walls having a filler opening,
   (a) a removable cover for the opening,
  (2) an opening in the bottom thereof for the discharge of ground pepper from the casing;
 (B) means forming an annular grinding surface disposed within the casing;
 (C) means forming a second annular grinding surface rotatably movable relative to and in cooperative relationship with the first mentioned grinding surface;

(D) means having a spiral portion disposed axially of the second mentioned means;

(E) and means within the casing for mounting the spiral means for vertical sliding movement relative to the casing, said spiral means being engageable with the second mentioned means for positively causing rotatable movement to be imparted to the second mentioned means in response to vertical shaking movement of the casing.

15. A shaker type pepper-corn grinder unit comprising, in combination:

(A) a vertically shakable casing for pepper-corns, said casing having:
   (1) closed side walls and a closed top wall, one of said walls having a filler opening,
     (a) a removable cover for the opening,
   (2) an opening in the bottom thereof for the discharge of ground pepper from the casing;

(B) means forming a grinding surface disposed within the casing;

(C) means forming:
   (1) a second grinding surface within the casing, said second grinding surface being movable relative to and in cooperative grinding relationship with the first mentioned grinding surface,
   (2) said last means including a vertically movable mechanism for imparting grinding movement to the second mentioned grinding surface;

(D) and means for mounting said mechanism within the casing for relative sliding movement between the casing and the vertical movable mechanism while vertical shaking movement is imparted to the casing.

References Cited in the file of this patent

UNITED STATES PATENTS

| | | |
|---|---|---|
| 526,203 | Schwarzenberger | Sept. 18, 1894 |
| 597,077 | Ackermann | Jan. 11, 1898 |
| 632,044 | Chapman | Aug. 29, 1899 |
| 1,757,297 | Dinsmoor | May 6, 1930 |
| 1,931,089 | Schwartz | Oct. 17, 1933 |
| 1,960,089 | Rabb | May 22, 1934 |
| 1,970,891 | King | Aug. 21, 1934 |
| 2,545,240 | Patoe | Mar. 13, 1951 |
| 2,679,360 | Arni | Mar. 13, 1954 |
| 2,782,998 | Hastings | Feb. 26, 1957 |
| 2,963,916 | Rommel | Dec. 13, 1960 |